United States Patent [19]

Nonaka

[11] Patent Number: 4,944,492
[45] Date of Patent: Jul. 31, 1990

[54] WEDGE-TYPE JACK APPARATUS FOR RAISING STRUCTURE WHILE SUSTAINING VERY LARGE PRESSURE DUE TO SAME AND TEMPORARILY SUPPORTING THE STRUCTURE

[75] Inventor: Haruo Nonaka, Sakai, Japan

[73] Assignee: Matsuo Engineering Co., Ltd., Osaka, Japan

[21] Appl. No.: 369,972

[22] Filed: Jun. 22, 1989

[30] Foreign Application Priority Data

Jun. 24, 1988 [JP]  Japan ................................ 63-157469
Jun. 25, 1988 [JP]  Japan ............................ 63-84331[U]

[51] Int. Cl.⁵ ............................................ B24B 41/06
[52] U.S. Cl. .................................................. 254/104
[58] Field of Search ................. 254/104, 92; 264/78.1, 264/234; 248/180; 52/745–747

[56] References Cited

U.S. PATENT DOCUMENTS

| | | | |
|---|---|---|---|
| 2,327,297 | 8/1943 | Woodruff | 254/104 |
| 3,390,862 | 7/1968 | Schrepfer | 254/104 |
| 3,774,352 | 11/1973 | Weber | 254/104 |
| 4,053,255 | 10/1977 | Taylor | 254/104 |
| 4,184,665 | 1/1980 | Queen | 254/104 |
| 4,559,986 | 12/1985 | Svensson et al. | 254/104 |

FOREIGN PATENT DOCUMENTS

| | | | |
|---|---|---|---|
| 181460 | 3/1955 | Austria | 254/104 |
| 50-102134 | 8/1975 | Japan . | |
| 55-126357 | 9/1980 | Japan . | |
| 60-22127 | 5/1985 | Japan . | |
| WO80/02172 | 10/1980 | PCT Int'l Appl. | 254/104 |

*Primary Examiner*—Robert C. Watson
*Attorney, Agent, or Firm*—Armstrong, Nikaido, Marmelstein, Kubovcik & Murray

[57] ABSTRACT

The present invention relates to a method of raising a structure while sustaining very large pressure due to same and then tmeporarily supporting the structure, and a wedge-type jack apparatus for use in the method. The wedge-type jack apparatus comprises a wedge-like drive member, an upper member and a lower member, these three members being disposed in a frame body such that the drive member is sandwiched between the upper and lower members in a laminated manner. A slide plate rests on the upper member. When the wedge-like drive member is pushed in a lengthwise direction, the upper member and the wedge-like drive member are moved up to raise the structure overlying the slide plate, while keeping the current condition unchanged. Upon the structure being raised up to a desired level, this level is maintained by stopper means which restricts movement of the wedge-like drive member. Thus, the wedge-type jack apparatus supports the structure while transmitting the load of the structure to a substructure.

8 Claims, 8 Drawing Sheets

WEDGE-TYPE JACK APPARATUS FOR RAISING STRUCTURE WHILE SUSTAINING VERY LARGE PRESSURE DUE TO SAME AND TEMPORARILY SUPPORTING THE STRUCTURE

BACKGROUND OF THE INVENTION

1. Field of the Invention

The present invention relates to a method of raising a structure while sustaining very large pressure due to same and then temporarily supporting the structure, and a wedge-type jack apparatus for use in the method, for the purpose of repairing or replacing supports or the like interposed between structures, such as bridges, and substructures.

2. Description of Prior Art

Figure 9:
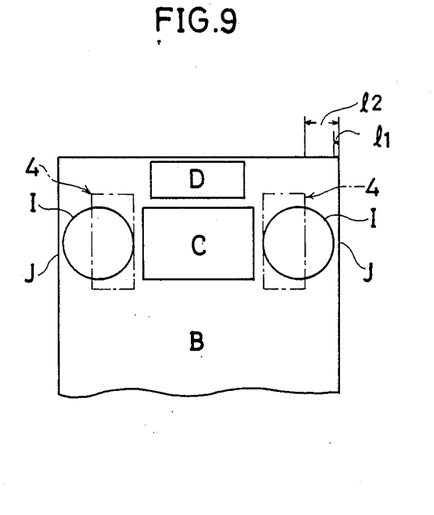
FIG. 9-11 are explanatory views of prior arts.

As shown in FIG. 9, between a structure A, such as a bridge or express highway, now under a completed condition and a substructure B, there are interposed supports C made of metal, etc., one at either of opposite ends of the substructure B in a lengthwise direction, for certainly transmitting to the substructure B not only vertical loads including the dead load of the structure A and the active load due to passage of vehicles, etc., but also various horizontal loads acting in a direction perpendicular to the vertical bridge axis due to earthquakes, winds, etc. The supports C must be repaired or replaced, as required, because they will deteriorate with time for many factors such as cracks caused by distortion and bending stress due to the load of the structure A, vibration, etc., as well as corrosion caused by rain, antifreezing mixtures, etc.

To data, therefore, the support C has been repaired or replaced as follows. Specifically, a plurality of metal plates or steel saddles are first piled up near the support C to a level substantially equal to that of the support C, thereby providing a temporary receiving member D. An ordinary hydraulic jack I capable of raising the structure A is then installed near the support C in a gap between the structure A and the substructure B. The jack I is operated to jack up the structure A until it detaches slightly away from the support C. Then, additional metal plates or the like are piled up on the temporary receiving member D to temporarily support the structure A. Under this condition, the support C is removed and repaired or replaced, followed by setting the repaired or new support in the original position. The jack I is operated to once jack up the structure A again for removing the temporary receiving member D, and then jack down it to the original condition. However, the ordinary jack I is required to be large in capacity in order to raise the structure as heavy as several hundreds through several thousands tons near its supporting point. Such ordinary jack I of large capacity can rarely be installed in the gap between the structure A and the substructure B, and is given with a too narrow space for installation. In practice, the length between the support C and a shoulder edge J of the substructure B, i.e., the edge-to-edge distance, is about 10–30 cm, and the height of the support C, e.g., bearing plate support, is about 10–20 cm. In addition, since the support C is usually installed in an elevated place as high as several meters through several tens meters, installation of the jack of large capacity cannot be performed by only human power and may entail risk. When the jack of large capacity is lowered from the bridge using a crane, it has been unavoidable to suspend traffic of vehicles temporarily. Moreover, attached to the lower central surface of the structure A and adjoining regions are girders for reinforcing the structure A, pipings and other attachments in lengthwise and crosswise directions, leaving no space between the supports C and C to install the jack. Accordingly, the repair or replacement work has been unable to perform in some cases.

Figure 10:
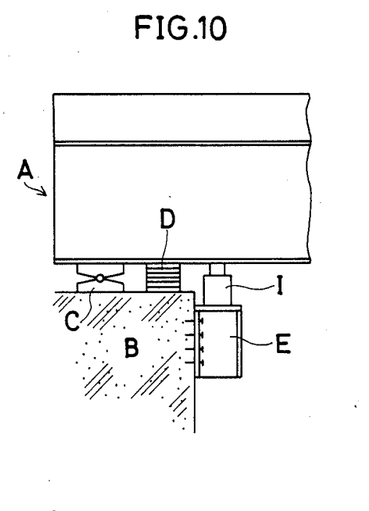

For the reason, there has been proposed a so-called bracket method. Specifically, as shown in FIG. 10, the temporary receiving member D comprising metal plates or the like are first interposed with height substantially equal to the gap between the structure A and the substructure B. A bracket E made of metal or other material is then fixed to a side wall of the substructure B in an appropriate position by bolts or the like. The ordinary jack I is installed on the bracket E and operated to jack up the structure A by about several millimeters. Under this condition, additional metal plates are placed on the temporary receiving member D to increase its height corresponding to a gap between the temporary receiving member D and the jacked-up structure A, for thereby supporting the structure A temporarily. Then, the support C is removed and repaired or replaced. The ordinary jack I is operated to jack up the structure A again to remove the temporary receiving member D, followed by jacking down it to the original condition.

Figure 11:
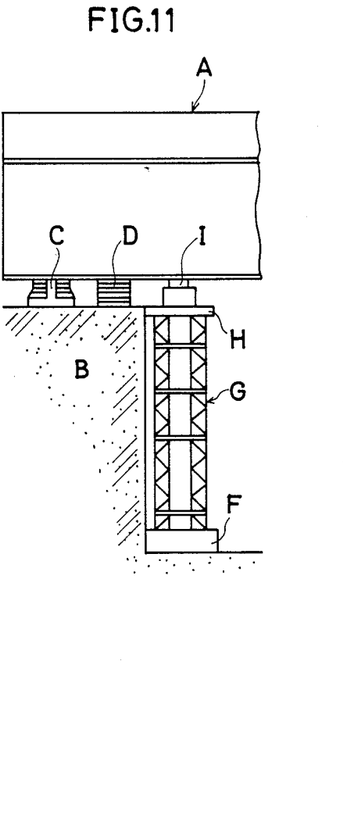

Alternatively, there has also been proposed a so-called steel bent method. Specifically, as shown in FIG. 11, a foundation F made of concrete or the like is formed on the ground immediately adjacent the substruction B with an intention to extend the substructure B. A steel scaffold G is vertically built up to a level almost equal to the top of the substructure B. A temporary substructure H is set to make a horizontal plane at the top of the steel scaffold G, and the ordinary jack I is installed on the temporary substructure H. Then, in a like manner to the above, the jack I is operated to jack up the structure A for supporting it temporarily.

The above methods are only examples to cope with the hard situations. In some cases, dependent on installation place or size of the support, the ordinary hydraulic jack I cannot be installed in the gap between the structure and the substructure, and the level of the structure is too high to carry out the work of installing the ordinary jack. In other cases, although an ample gap is present between the structure and the substructure, the base area is too small for installation of the ordinary jack I. These relevant problems are summarized below.

① to raise a heavy structure as much as several several hundreds through several thousands tons near its supporting point, while keeping the current condition unchanged, requires the ordinary jack I of large capacity. Such conventional ordinary jack I of large capacity cannot be sometimes installed in the gap between the structure and the substructure, and hence cannot be employed for raising the structure directly. Even if can be installed, the resulting small working area causes inconvenience because both the temporary receiving member and the ordinary jack I must be installed near the support on the substructure.

② For safety, to raise a structure of, e.g., 100t requires a jack with the maxium power of about 150t taking into consideration of a safety factor. Because a cylinder of the ordinary jack I is in the form of column, the load is applied to the region near the shoulder edge J of the substructure B as shown in FIG. 9. This leads to a fear that the region near the shoulder edge J of the substructure B may fatigue and break down.

③ When jacked up, it is enough to raise the structure to such an extent that the structure detaches away from the support by several millimeters. Since the ordinary jack I, in place of the support, is subjected to vertical and horizontal loads and vibration transmitted from the structure and so on during repair of the support, the structure cannot be sustained by the ordinary jack I alone for a long period. To this end, the temporary receiving member requires to be interposed between the structure and the substructure. Therefore, the structure is once jacked up to an excessively lifted state, i.e., a level inclusive of the excessively lifted amount taking into account a sink, fit, etc. which will occur with time after installation of the temporary receiving member. However, lifting the end of the structure too excessively causes a warp in the structure, resulting in a risk that the floor concrete may crack near a cross girder at the end.

④ When jacked down, the ordinary hydraulic jack I is difficult to adjust a reduction in the hydraulic pressure. This causes the structure to be lowered abruptly by its dead load, making it hard to control jack-down.

⑤ Usually, since vehicles and so on are passing over the upper surface of the structure even during repair of the support, the step difference between the concerned structure and the adjacent structure must be in order of 10 mm for safety, presenting a limitation in the raised height of the former. Therefore, precise operation is needed in raising the structure to reduce the step difference. But, it is difficult to finely adjust raising control by the ordinary hydraulic jack I, resulting in a fear that some error may occur when raising the structure.

⑥ Where the support is installed over the surface of a river, sea, etc., a working ship or the like is located under the support and then the support is repaired using a crane equipped on the ship. This leads to the large-scaled work and takes considerable cost and time.

⑦ The ordinary jack I has a large weight and is difficult to move by human power for installation. Further, because the relatively high jack is vertically mounted, there is a risk that the jack may turn over and drop due to earthquakes or vibration. This will invite a serious accident.

⑧ The bracket method, steel bent method, etc. need a great deal of time and cost to prepare the temporary sub-structure before raising of the structure.

⑨ While the structure is resting on the ordinary jack or the temporary receiving member, the upper surface of the structure is subjected to active loads due to passing vehicles and so on in lengthwise and crosswise directions. There is a risk of serious accident that the structure may drop off the ordinary jack or the temporary receiving member during the work.

The present invention is intended to solve the problems as mentioned above, and to provide a method of raising a structure while sustaining very large pressure due to same and then temporarily supporting the structure by the use of a wedge-type jack which can safely raise the structure directly irrespective of the installation place of a support, and a wedge-type jack apparatus for use in the method.

BRIEF SUMMARY OF THE INVENTION

The present invention has been accomplished to solve the above-mentioned problem. A wedge-type jack apparatus of the present invention to be placed in a gap between a structure and a substructure is constructed such that a wedge-like drive member restricted in movement in a widthwise direction and having inclined surfaces on both upper and lower sides is held in association with push means between a lower member, which has on the upper side an inclined surface substantially commensurate with the inclined surface on the lower side of the wedge-like drive member and is restricted in movement in both widthwise and lengthwise directions, and an upper member, which has on the lower side an inclined surface substantially commensuate with the inclined surface on the upper side of the wedge-like drive member and is restricted in movement in both widthwise and lengthwise directions. By operating the push means to push the wedge-like drive member in a lengthwise direction into between the upper and lower members, the wedge-like drive member is moved in a length-wise direction while rising along the inclined surface on the upper side of the lower member, and the upper member is also moved up along the inclined surface on the upper side of the wedge-like drive member, thereby raising the structure. The stopper means prevents the wedge-like drive member from returning from that condition. Thus, it restricts movement of the wedge-like drive member to sustain the structure in a raised state.

Also, there can be provided a method of raising a structure while sustaining very large pressure due to same and then temporarily supporting the structure, in which when the push means is operated to push the wedge-like drive member, the wedge-like drive member is moved in a lengthwise direction while rising along the inclined surface on the upper side of the lower member, and the upper member is also moved up along the inclined surface on the upper side of the wedge-like drive member. Thus, by installing the wedge-type jack apparatus, which incorporates the wedge-like drive member, associated with the push means, and the upper and lower members, in the gap between the structure and the substructure, and then operating the push means, the upper member is moved up to raise the structure while keeping the current condition unchanged. When the structure reaches a desired level, the stopper means is fitted to fix the wedge-like drive member in the pushed position for preventing return of the wedge-like drive member. As a result, the structure is supported temporarily to permit the repair or replacement work of the support currently employed for bearing the structure.

DETAILED DESCRIPTION OF PREFERRED EMBODIMENTS

Figure 1:
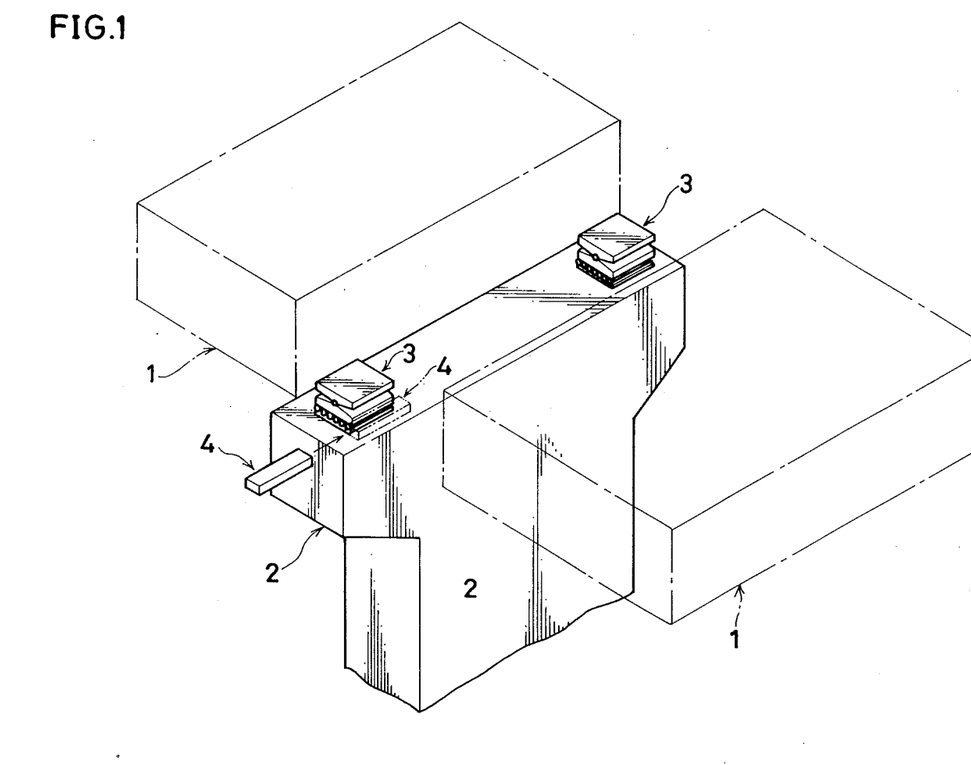
FIG. 1 is an explanatory view showing a state that a wedge-type jack apparatus of the present invention is installed between a substructure and a structure.

Details of the present invention will be described with reference to the accompanying drawings. As shown in FIG. 1, between a structure 1, such as a bridge or express highway, and a substructure 2 for supporting the structure 1, there are inteposed supports 3 made of metal of certainly transmitting to the substructure 2 vertical loads such as the dead and active loads exerted on the structure 1, more specifically, for transmitting the dead load of the structure 1, the active load due to passage of vehicles, etc., as well as various horizontal loads acting in a direction perpendicular to the vertical bridge axis due to expansion and contraction caused by fluctuations in temperature, earthquakes, winds, etc. The supports 3 must be repaired or replaced, as required, because they may suffer from cracks caused by the load of the structure 1 applied thereto directly, or corrosion caused by rain, antifreezing mixtures, etc. However, the support 3 is often installed at an elevated place about 20-30 m above the ground, and this causes inconvenience and risk during the work. Further, the length between the support 3 and a shoulder edge of the substructure 2, i.e., the edge-to-edge distance, is about 10-30 cm, and the height of the support C, e.g., bearing plate support, is about 10-20 cm only. Thus the space and gap are too small to install an ordinary jack. If the ordinary jack can be installed, a temporary receiving member must be interposed, which intensifies difficulties because of the narrower working space and the increased number of work steps. To the contrary, the present invention makes it possible to temporarily support the structure 1 with ease.

Specifically, the structure is raised while sustaining very large pressure due to same and then temporarily supported as follows. By pushing a wedge-like drive member in a lengthwise direction using push means associated therewith which drive member is restricted in movement in a widthwise direction and having inclined surfaces on both upper and lower sides, the wedge-like drive member is moved in a lengthwise direction while rising along a lower member which has on the upper side an inclined surface substantially commensurate with the inclined surface on the lower side of the wedge-like drive member, and an upper member, which has on the lower side an inclined surface substantially commensurate with the inclined surface on the upper side of the wedge-like drive member is also moved along the inclined surface on the upper side of the wedge-like drive member, so that the structure is raised while keeping the current condition unchanged. When the structure reaches any desired level, the push operation of the wedge-like drive member is stopped and, at the same time, one or more plates made of metal or resin are interposed, as stopper means, between the push means and the wedge-like drive member, for thereby preventing the wedge-like drive member from being returned toward the proximal end side under the load applied from the structure.

Figure 2:
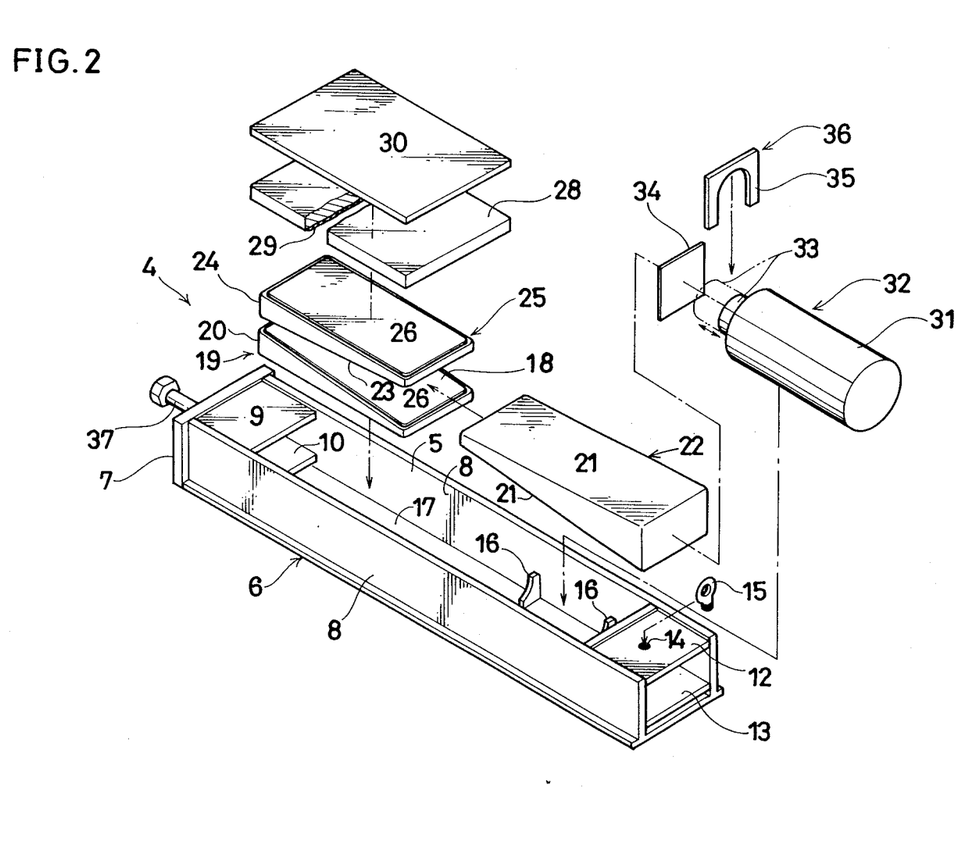
FIG. 2 is an exploded perspective view of the wedge-like jack apparatus for use in the present invention.
Figure 3:
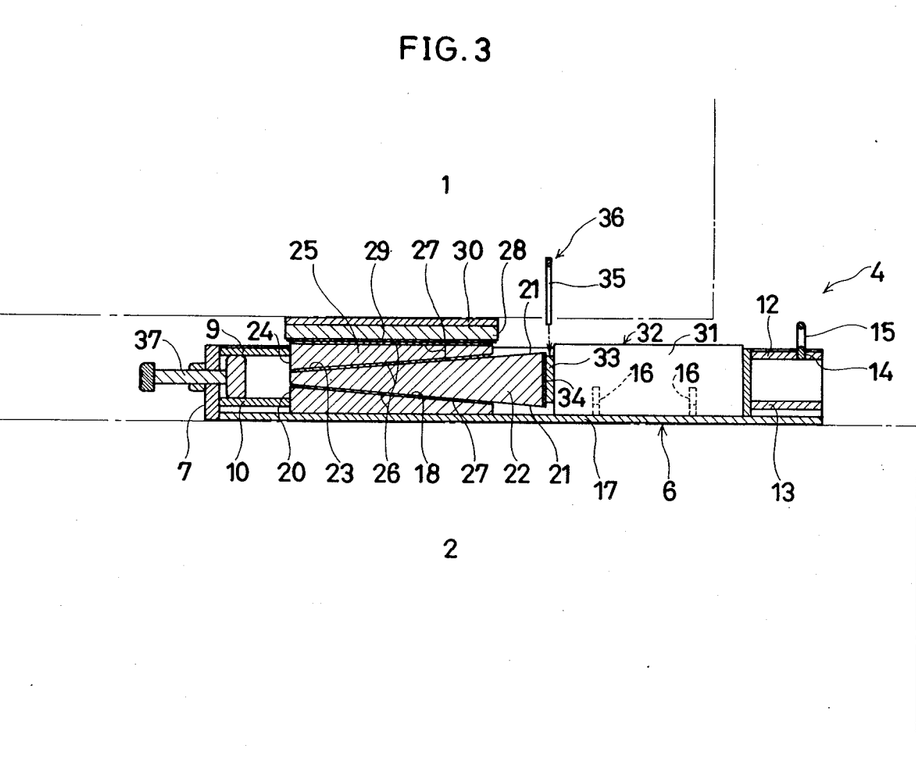
FIG. 3 is a longitudinal sectional side view of the wedge-type jack apparatus taken along its center line, with the internal mechanism of a hydraulic jack, as push means, being omitted.

Hereinafter, there will be described a wedge-type jack apparatus 4 for use in the method of raising the structure while sustaining very large pressure due to same and then temporarily supporting the structure. More specifically, as shown in FIGS. 2 and 3, a box-like, metal-made frame body 6 open at its upper surface to define an opening 5 and having a rectangular shape in plan view is so sized as to be placed between the structure 1 and the substructure 2 near the support 3. Taking one short side wall 7 as a distal end in a lengthwise direction, two metal-made plate members 9, 10 are fixed in place with a small gap therebetween such that they are closely fitted with the inner surfaces of the short side wall 7 and two long side walls 8, 8. The plate members 9, 10 serve to restrict movement of only upper and lower members (described later) in a lengthwise direction, respectively, and reinforce the frame body 6. Likewise, fixed to the outer surface of an opposite short side wall 11 on the proximal end of the frame body 6 are two metal-made plate members 12, 13 which serve to reinforce the frame body 6 and bear reaction forces of a hydraulic jack (described later). A threaded hole 14 is defined nearly at the center of the plate member 12, and an eye bolt 15 or the like is screwed into the threaded hole 14, thereby providing a latch member to which a rope or the like is tied for transportation. Two pairs of plate pieces 16 each having a substantially L-shape are fixed to the inner surface of the frame body 6 at appropriate positions on the proximal end side, such that the angled corners of the plate pieces 16 are joined to the angled corners formed by the long side walls 8, 8 and a bottom plate 17 of the frame member 6, for thereby preventing the later-described hydraulic jack from being turned over. In the frame body 6 thus formed, there is fitted a lower member 19 of substantially rectangular shape in plan view, which has on its upper side an inclinded surface 18 substantially commensurate with an inclined surface on the lower side of the wedge-like drive member (described later), and a widthwise size defined by the long side walls 8, 8 of the frame body 6, in such a manner that a short side wall 20 of the lower member 19 having a greater thickness is abutted against the plate member 10.

Placed on the lower member 19 is a wedge-like drive member 22 which has inclined surfaces 21, 21 on both upper and lower sides, a widthwise size equal to that of the lower member 19, and a lengthwise size somewhat larger than that of the lower member 19. Then, placed on the wedge-like drive member 22 is an upper member 25 which has on its lower side as inclined surface 23 substantially commensurate with the inclined surface 21 on the upper side of the wedge-like drive member 22, and a shape substantially commensurate with the lower member 19 in plan view, in such a manner that a short side wall 24 of the upper member 25 having a greater thickness is abutted against the plate member 9. Thus, the upper and lower members 25, 19 and the wedge-like drive member 22 are laminated with the latter sandwiched between the upper and lower members 25, 19.

Figure 6A:
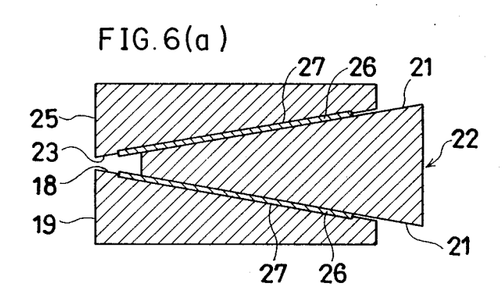
FIG. 6 is an enlarged sectional view of a wedge-like drive member, an upper member and a lower member.
Figure 6B:
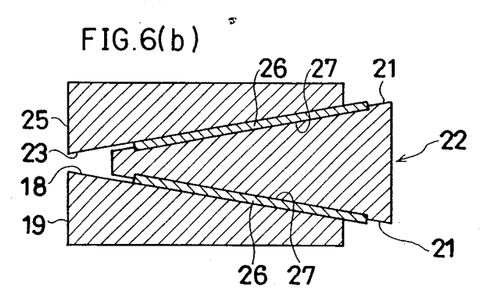

The upper and lower members 25, 19 and the wedge-like drive member 22 can be made of a metal steel such as a plain steel, stainless steel, alloy steel, etc., ceramics capable of resisting against high load, or hard synthetic resin polymerized for a long time under high temperature and high pressure. At the contact regions between the inclined surfaces 23, 18 of the upper and lower members 25, 19 and the upper and lower inclined surfaces 21, 21 of the wedge-like drive member 22, respectively, there will occur friction when the wedge-like drive member 22 is moved. For the reason, as shown in FIG. 6(a), plates made of polytetrafluoroethylene resin, serving a low-friction plates 26, are directly bonded to the inclined surfaces 23, 18 of the upper and lower members 25, 19. Alternatively, recesses 27 with a thickness less than the low-friction plate 26 and a plane size slightly smaller than the inclined surfaces 23, 18 of the upper and lower members 25, 19 are defined in the inclined surfaces 23, 18, and the low-friction plates 26 are then fitted in and bonded to the recesses 27. Otherwise, as shown in FIG. 6(b), the low-friction plates 26 are directly bonded all over the upper and lower inclined surfaces 21, 21 of the wedge-like drive member 22. Alternatively, recesses 27 slightly smaller in size than the upper and lower inclined surfaces 21, 21 of the wedge-like drive member 22 are defined in the upper and lower inclined surfaces 21, 21 and the low-friction plates 26 are then fitted in and bonded to the recesses 27. Thus, the low-friction plates 26 are interposed at the contact regions between the wedge-like drive member 22 and the upper and lower members 25, 19.

In this connection, the inclined surfaces 21 of the wedge-like drive member 22 and the inclined surfaces 23, 18 of the upper and lower members 25, 19 can be improved in slidability by fusing of molybdenum disulfide, coating of plated chromium, fixing of a stainless steel, metal spraying of nickel, chromium, stainless steel, etc., or grinding. The low-friction plate 26 can be made of polytetrafluoroethylene resin (hereinafter referred to as PTFE), a mixture of PTFE and graphite fibers, a mixture of PTFE, graphite fibers and molybdenum disulfide, a mixture of PTFE and an copper alloy, or a copper alloy or steel material of which surface is grounded and then processed by fusing of molybdenum disulide. As an alternative, a dry slide liquid may be coated on the metal surface in place of the low-friction plate 26. Incidentally, if the respective inclined surfaces have enough slidability and material strength capable of resisting in practical use, i.e., if they are made of special stainless material, for example, the aforesaid members can be employed without need of any surface treatment as mentioned above.

Furthermore, a metal-made plate having the plane area larger than the upper member 25 is placed, as a slide plate 28, on the upper member 25 for being movable in a horizontal direction. In order to ensure smoothe movement of the slide plate 28 in a horizontal direction, a thin stainless plate 29 is bonded to underside of the slide plate 28. Placed on the slide plate 28 is a buffer plate 30 which has a shape substantially commensurate with the slide plate 28 in a plan view, and is formed of urethane rubber or the like with slight elasticity to provide the shock absorbing capability.

The wedge-type jack apparatus 4 is installed and operated as follows. To begin with, the frame body 6 including the lower member 19, the wedge-like drive member 22 and the upper member 25 all fitted therein is set in the gap between the structure 1 and the substucture 2 near the support 3 such that the frame body 6 is positioned away from the edge of the substructure 2 as far as possible. Alternatively, the frame body 6 is first set in the gap between the structure 1 and the substructure 2 near the support 3, followed by fitting the lower member 19, the wedge-like drive member 22 and the upper member 25 in the frame body 16. Thereafter, the slide plate 28 with the stainless plate 29 bonded to its underside and the buffer plate 30 are placed on the upper member 25. At this time, before placing the plates 28, 30, a plate (not shown) is inserted between the frame body 6 and the substructure 2, so that the a gap between the upper surface of the buffer plate 30 and the lower surface of the structure 1 is adjusted to become about 0–several millimeters. Then, a hydraulic jack 31 is rested on the plurality of plate pieces 16 provided on the proximal end side of the wedge-like drive member 22 such that the hydraulic jack 31 is positioned in a lengthwise direction and surely prevented from rolling, thereby providing push means 32. A plate 34 such as a copper plate serving to reduce friction is interposed between the distal end face of a rod 33 of the hydraulic jack 31 and the proximal end face of the wedge-like drive member 22. Thereafter, when the hydraulic jack 31 is operated, the rod 33 pushes the proximal end face of the wedge-like drive member 22, whereupon the inclined surface 21 on the lower side of the wedge-like drive member 22 is moved in a forward direction while rising along the inclined surface 18 of the lower member 19, and the inclined surface 23 of the upper member 25 is also moved up along the inclined surface 21 on the upper side of the wedge-like drive member 22. Thus, the buffer plate 30 on the upper member 25 comes into abutment against the structure 1 to raise the structure 1 while keeping the current condition unchanged. When reaching a desired level, the structure 1 can be supported at that raised level temporarily with the aid of stopper means 36 without using any temporary receiving member as employed in the prior art, while maintaining the hydraulic jack 31 in operation. Adopted as the stopper means 36 are one or more stopper plates 35 each comprising a substantially inverted U-like plate and fitted over the rod 33 exposed between the proximal end face of the wedge-like drive member 22 and the distal end of the hydraulic jack 31, one or more rods with pins inserted to partially protrude therefrom, or any other suitable means for preventing return of the wedge-like drive member 22.

Because the ratio of the force of the hydraulic jack to the vertical load including the empty weight of the structure has been 1:1 in the prior art, the jack used for raising the structure as heavy as several hundreds through several thousands tons near it supporting point requires necessarily to be large in capacity, resulting in the problem that the jack cannot be installed in the gap near the support 3. According to the present invention, however, it has been found from the result of experiment that, as shown in <Table1>, utilization of the wedge slope and the sliding function enables to raise even the structure having its empty weight larger than the force of the hydraulic jack. More specifically, as seen in <Table 1>, the coefficient of friction $\mu$ has different values dependent on combinations of the wedge-like drive member 22 and the low-friction plates 26 and other factors. In view of this, <Table1> shows the jack forces P as necessary for raising the structure when the coefficient of friction $\mu$ is set to 0.07, 0.10, 0.15 and 0.20 with the vertical load R held at a constant, and the wedge slope is varied in a range of 2.3° (4%)–33° (65%) at each setting value of the coefficient of friction $\mu$. For example, in case of the wedge slope being 4.5° (8%) and the coefficient of friction $\mu$ being 0.07, the value of 0.30 R can be seen from <Table 1>. This means that the structure can be raised with the force of the hydraulic jack equal to 30% of the vertical load. Thus, the combinations within a frame surrounded by thin lines in <Table1> make it possible to raise the structure 1 with the jack force P equal to or less than the vertical load R. In practice, however, the necessary force of the hydraulic jack is preferably not larger than ½ of the empty weight of the structure. It is seen that the necessary force of the hydraulic jack can be reduced to the order of 1/2–1/5 using the combinations within a frame surrounded by fat lines corresponding to the wedge slope in a range of 2.3°–8.5°. Further, in some cases of employing the low-friction plates 26 formed of PTFE, the wedge-like drive member 22 is seized between the upper and lower members 25, 19 and hence would not move toward the proximal end side at the larger wedge slope when lowering the structure. In such cases, for returning the wedge-like drive member 22 toward the proximal end side, a start-up force must be applied to the distal end of the wedge-like drive member 22 using any suitable means such as a push member 37. Taking into account various safety factors during the raise-up operation, in addition to the above problem, it is more preferable to reduce the necessary force of the hydraulic jack down to about ¼ of the empty weight of the structure. Thus, by setting the coefficient of friction $\mu$ to 0.07 with the wedge slope ranging 2.8°–5.7°, the structure can be raised with the force of the hydraulic force in order of ⅓–¼ of the empty weight of the structure. When lowered down, the wedge-like drive member 22 spontaneously moves toward the proximal end side under the action of the weight of the structure 1 by removing the stopper means 36. In addition, a hydraulic jack of smaller capacity can be used and operated in a fallen-down or horizontal attitude, as a result of which the size of the wedge-type jack apparatus 4 is so reduced correspondingly that it can be installed in the gap near the support 3. Moreover, the hydraulic jack 31 is not necessarily placed in the gap near the support 3 for raising, because the structure can be raised with only the wedge-like drive member 22, the upper member 25 and the lower member 19 of the wedge-type jack apparatus 4 capable of being placed in that gap.

Figure 4:
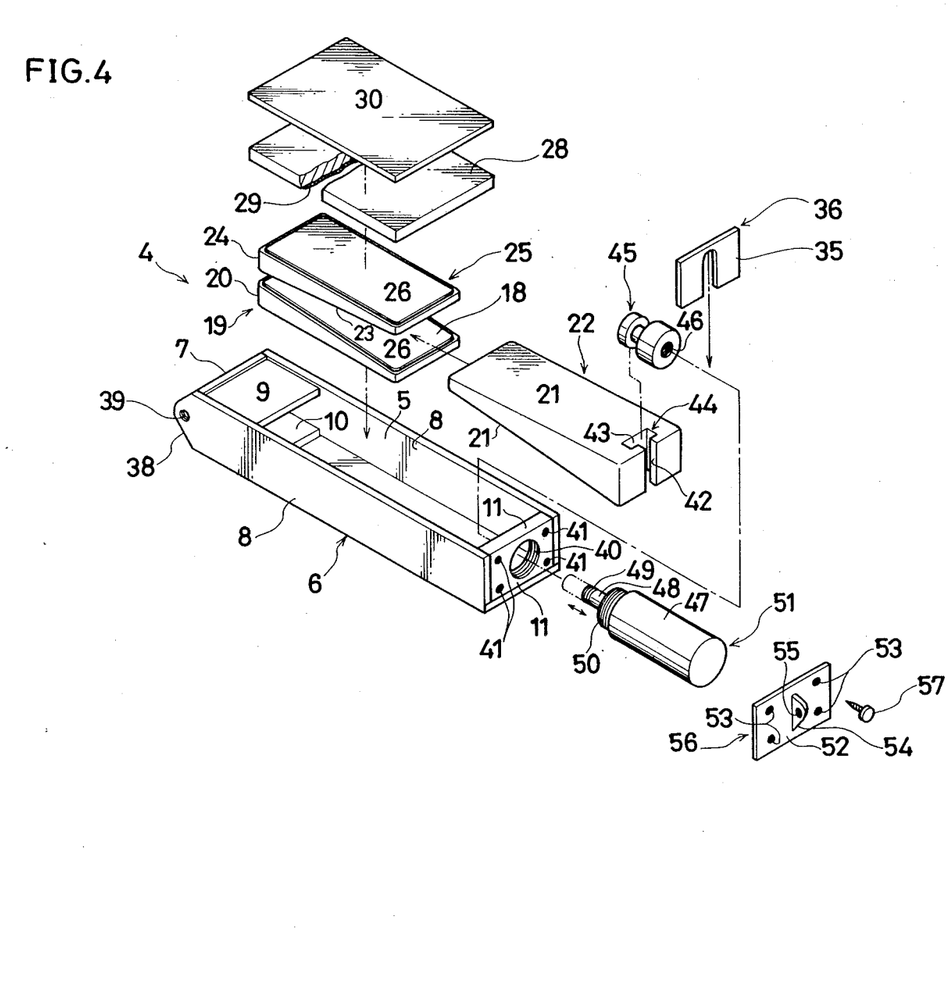
FIG. 4 is an exploded perspective view showing another embodiment of the wedge-type jack apparatus.
Figure 5:
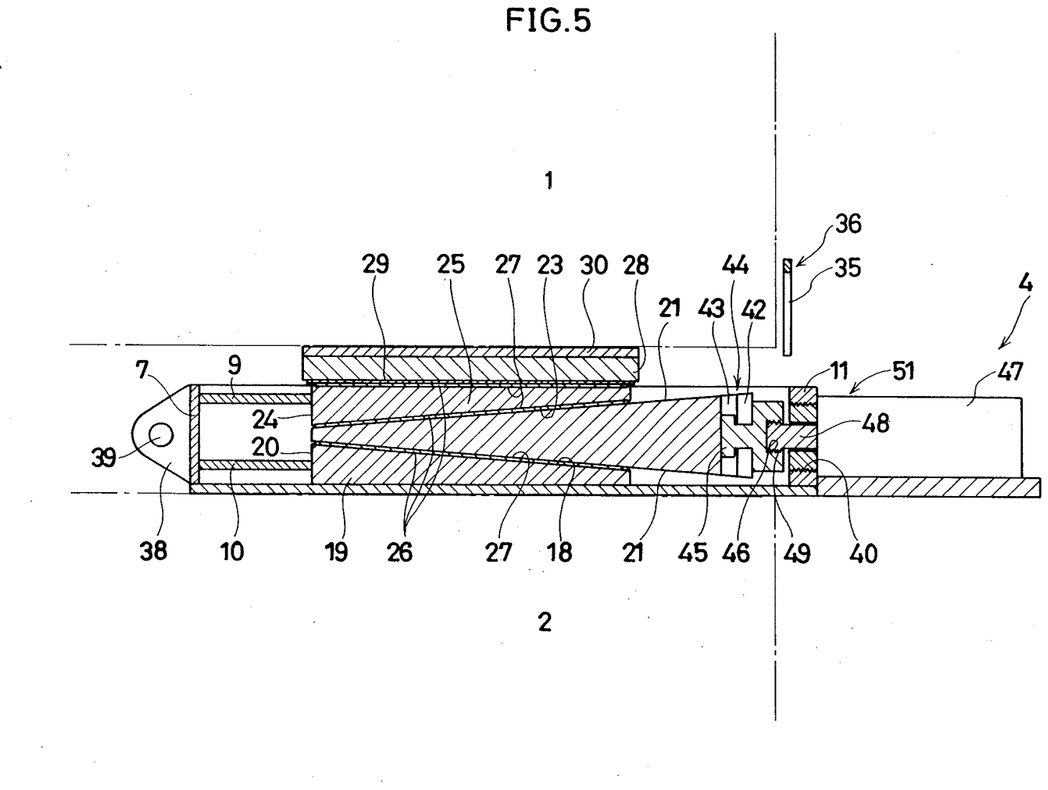
FIG. 5 is a longitudinal sectional side view of the wedge-type jack apparatus according to another embodiment taken along its center line, with the internal mechanism of a hydraulic jack, as push means, being omitted.

The wedge-type jack apparatus according to another embodiment in view of the above point is shown in FIGS. 4 and 5. More specifically, a box-like, metal-made frame body 6 open at its upper surface to define an opening 5 and having a rectangular shape in plan view is so sized as to be placed between the structure 1 and the substructure 2 near the support 3. Taking one short side wall 7 as a distal end in a lengthwise direction, two metal-made plate members 9, 10 are fixed in placed with a small gap therebetween such that they are closely fitted with the inner surfaces of the short side wall 7 and two long side walls 8, 8. The plate members 9, 10 serve to restrict movement of only upper and lower members 25, 19 in a lengthwise direction, respectively, and reinforce the frame body 6. The distal ends of the long side walls 8, 8 are protruded beyond the short side wall 7 to form projections 38, 38, and threaded holes 39, 39 are defined in the projections 38, 38 at corresponding positions. On the other hand, an opposite short side wall 11 on the proximal end of the frame body 6 is formed with a threaded hole 40 substantially at the center for fixing a hydraulic jack (described later), as well as a plurality of threaded holes 41 at the corners. In the frame body 6 thus formed, there is fitted the lower member 19 of substantially rectangular shape in plan view, which has a widthwise size defined by the long side walls 8, 8 of the frame body 6, in such a manner that a short side wall 20 of the lower member 19 having a greater thickness is abutted against the plate member 10.

Placed on the lower member 19 is a wedge-like drive member 22 which has inclined surfaces 21, 21 on both upper and lower sides, a cut-out portion 44 formed in the proximal end side, a widthwise size equal to that of the lower member 19, and a lengthwise size somewhat larger than that of the lower member 19, the cut-out portion 44 having a substantially T-shape in plan view and comprising both a groove 42 extending from the proximal end face in a lengthwise direction and a groove 43 continuous to and extending from the groove 42 in a widthwise direction. Then, placed on the wedge-like drive member 22 is the upper member 25 in such a manner that a short side wall 24 of the upper member 25 having a greater thickness is abutted against the plate member 9. Thus, the upper and lower members 25, 19 and the wedge-like drive member 22 are laminated with the latter sandwiched between the upper and lower members 25, 19.

The wedge-type jack apparatus 4 is installed and operated as follows. To begin with, the frame body 6 including the lower member 19, the wedge-like drive member 22 and the upper member 25 all fitted therein is set in the gap between the structure 1 and the substructure 2 near the support 3 such that the frame body 6 is positioned away from the edge of the substructure 2 as far as possible. Alternatively, the frame body 6 is first set in the gap between the structure 1 and the substructure 2 near the support 3, followed by fitting the lower member 19, the wedge-like drive member 22 and the upper member 25 in the frame body 6. Thereafter, a connector 45 is fitted in the cut-out portion 44 comprising both the groove 42 extending from the proximal end face of the wedge-like drive member 22 in a lengthwise direction and the groove 43 continuous to an extending from the groove 42 in a widthwise direction, such that the connector 45 can be moved only in a vertical direction. A threaded hole 46 is defined in the proximal end face in the connector 45 at its center, and an externally threaded portion 49 defined over the distal end of a rod 48 of a hydraulic jack indicated at 47 in the figures is screwed into the threaded hole 46 for interconnection therebetween. In addition, an externally threaded portion 50 is defined over the distal end of a body of the hydraulic jack 47 for being screwed into the threaded hole 40 defined at the center of the short side wall 11, so that the hydraulic jack 47 is fastened to the frame body 6, thereby providing push means 51. After thus associating the push means 51 with the wedge-like drive member 22, the slide plate 28 with the stainless plate 29 bonded to its underside and the buffer plate 30 are placed on the upper member 25. At this time, before placing the plates 28, 30, a plate (not shown) is inserted between the frame body 6 and the substructure 2, so that a gap between the upper surface of the buffer plate 30 and the lower surface of the structure 1 is adjusted to become about 0–several millimeters. Then, in a like manner to the above, when the hydraulic jack 47 is operated, the rod 48 pushes the wedge-like drive member 22 toward the distal end side, whereupon the inclined surface 21 on the lower side of the wedge-like drive member 22 is moved in a forward direction while rising along the inclined surface 18 of the lower member 19, and the proximal end of the wedge-like drive member 22 is elevated through sliding relation between the cut-out portion 44 and the connector 45 screwed to the distal end of the rod 48. Correspondingly, the inclined surface 23 of the upper member 25 is also moved up along the inclined surface 21 on the upper side of the wedge-like drive member 22. Thus, the buffer plate 30 on the upper member 25 comes into abutment against the structure 1 to raise the structure 1 while keeping the current condition unchanged. When reaching a desired level, the structure 1 can be supported at that raised level temporarily with the aid of stopper means 36 without using any temporary receiving member as employed in the prior art, while maintaining the hydraulic jack 47 in operation. Adopted as the stopper means 36 are one or more stopper plates 35 each comprising a substantially inverted U-like plate and fitted over the rod 48 exposed between the proximal end face of the connector 45 and the short side wall 11, one or more rods with pins inserted to partially protrude therefrom, or any other suitable means for preventing return of the wedge-like drive member 22.

Figure 7:
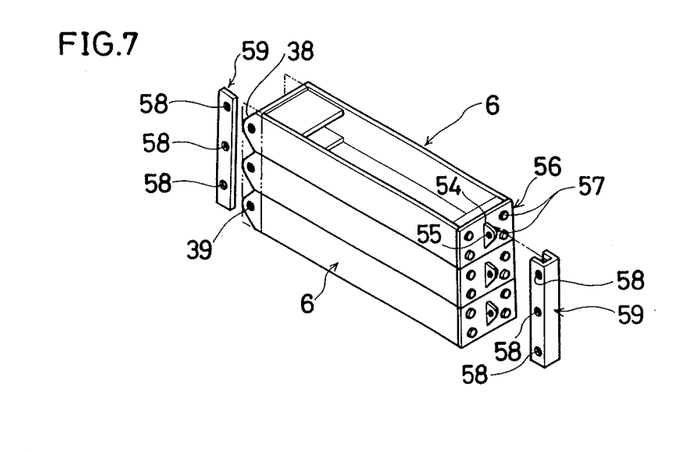
FIG. 7 is an explanatory perspective view showing a state that a plurality of frame bodies are laminated.

Furthermore, when the wedge-type jack apparatus 4 is removed after completion of the repair or replacement work of the support, the wedge-like drive member 22, the upper member 25, the lower member 19, the slide plate 28, the buffer plate 30, the hydraulic jack 47, the connector 45, the stopper plates 35 and the frame body 6 can be disassembled into separate components, making it possible to carry the components by human power. For convenience in transportation, after removing the hydraulic jack 47 from the frame body 6, a cover 56 is fixedly attached by means of screws 57 or the like, the cover 56 comprising a plate 52 formed with holes 53 in positions corresponding to the threaded holes 41 defined at the corners of the proximal end face of the frame body 6, with a projection 54 erected substantially at the center of the outer surface of the plate 52 and having a hole 55 bored nearly at the center of the projection 54. Then, the plurality of frame bodies 6 are piled up as shown in FIG. 7. By coupling between the holes 55 in the projections 54 of the covers 56 and a connector plate 59, which has holes 58 of the same diameter as the holes 55 at the corresponding positions to transfer the plural frame bodies 6 together. Likewise, it is also possible to couple the projections 38, 38 at the distal ends of the frame memeber 6 to the respective holes 58 bored in the connector plate 59 by lock means such as bolts, with the result that the plural frame bodies 6 are interconnected at the distal end side, too, for transporting the plural frame bodies 6 thus interconnected at once with more safety.

Figure 8A:
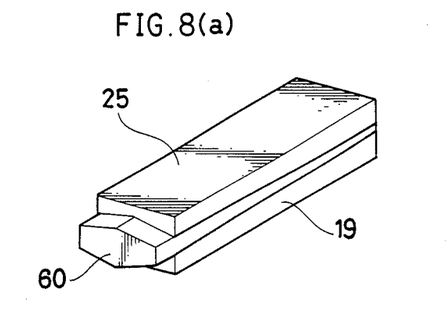
FIG. 8 is an explanatory perspective view of a wedge-like drive member, an upper member and a lower member according to another embodiment.
Figure 8B:
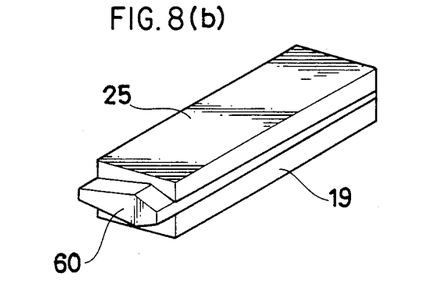

Although the wedge-like drive member 22 in the form of a plate is employed in the above embodiments, a wedge-like drive member 60 in the form of a polygonal pyramid such as shown in FIG. 8 may instead be employed so long as the wedge-like drive member has the inclined surfaces on both upper and lower sides. Further, although the above embodiments have been described as pushing the wedge-like drive member 22 in a lengthwise direction to raise the structure, it will be also possible to push the upper member 25 downward or sideward by pushing the wedge-like drive member 22, for example, if the wedge-type jack 4 is set turned over or laid on its side, respectively. In any case, the pushing force of the wedge-type jack appartus 4 can be sustained for a long time.

In addition, the wedge-type jack apparatus 4 of the present invention can of course be employed as not only means for raising heavy structures while keeping the current condition unchanged, but also means for pressing any materials. By way of example, when compacting crystalline high molecular resin, high pressure above 100 kg per 1 cm is applied and sustained for a long time (lasting several days sometimes). The wedge-like jack apparatus 4 according to the present invention can be employed as a pressing apparatus for compacting under such high pressure.

TABLE 1

| Wedge Slope | | Jack Force (P) | | | |
|---|---|---|---|---|---|
| i% | θ deg | μ = 0.07 | μ = 0.10 | μ = 0.15 | μ = 0.20 |
| 4 | 2.3 | 0.22R | 0.28R | 0.38R | 0.48R |
| 5 | 2.8 | 0.24R | 0.30R | 0.40R | 0.50R |
| 6 | 3.4 | 0.26R | 0.32R | 0.42R | 0.52R |
| 7 | 4.0 | 0.28R | 0.34R | 0.44R | 0.54R |
| 8 | 4.5 | 0.30R | 0.36R | 0.46R | 0.56R |
| 9 | 5.1 | 0.32R | 0.38R | 0.48R | 0.58R |
| 10 | 5.7 | 0.34R | 0.40R | 0.50R | 0.60R |
| 15 | 8.5 | 0.43R | 0.49R | 0.59R | 0.68R |
| 20 | 11.3 | 0.52R | 0.58R | 0.67R | 0.77R |
| 25 | 14.0 | 0.60R | 0.66R | 0.75R | 0.85R |
| 30 | 16.7 | 0.68R | 0.73R | 0.83R | 0.92R |
| 35 | 19.3 | 0.75R | 0.80R | 0.89R | 0.98R |
| 40 | 21.8 | 0.81R | 0.86R | 0.95R | |
| 45 | 24.2 | 0.86R | 0.91R | 1.00R | |
| 55 | 28.8 | 0.95R | 1.00R | | |
| 65 | 33.0 | 1.00R | | | |

As described above, according to the wedge-type jack apparatus of the present invention, even while the structure is held in a supported state, the slide plate interposed between the structure and the upper member is also moved responsive to movement of the structure in a horizontal direction caused by vehicles passing over the upper surface of the structure, etc. and the buffer plate interposed between the slide plate and the structure serves to absorb vibration in a vertical direction, as well as the resultant rotation force caused by the forces in vertical and horizontal directions, etc. This allows the wedge-type jack apparatus to undergo the vertical load at all times, for safely supporting the structure while preventing the wedge-type jack apparatus from being tilted. As a result, the wedge-type jack apparatus can reliably transmit both the dead load and the active load exerted on the structure to the substructure and hence substitute for the support.

With the low-friction plates provided at the contact surfaces between the wedge-like drive member and the upper and lower members, it becomes possible to reduce the coefficient of friction between the two members contiguous to each other, and hence to raise the structure with the smaller force produced from the hydraulic jack as pull means. Concurrently, the wedge-type jack apparatus can be reduced in size.

Furthermore, the wedge-type jack apparatus can be disassembled into the wedge-like drive member, the upper member, the lower member, the frame body and the hydraulic jack, etc,. each of these components having such weight as allowing it to be carried by human power. Thus, if the installation place of the support is at an elevated level, the components can be transferred easily, thereby enabling to greatly reduce both time and cost and also curtail the working steps.

Moreover, after the structure has been brought into a raised state, the stopper means can be used to restrict the wedge-like drive member from moving toward the proximal end side, for thereby supporting the structure at a desired level without need of any temporary receiving member. This permits to utilize a wider space in the gap near the support and facilitate the work.

Thus, since the wedge-like drive member and the upper and lower members are arranged such that those short side walls of the adjacent members having a smaller thickness are positioned in the opposite sides, the total height of the three laminated members can be reduced, and the widthwise length of each member can also be shortened. In addition, it becomes possible to raise the structure with the force of a hydraulic jack not larger than ½ of the empty load of the structure, as a result of which the size of the hydraulic jack becomes so small that it can be installed in the gap near the support. As indicated by imaginary lines in FIG. 9, in case of using the wedge-type jack apparatus 4 of the same surface area as the conventional ordinary jack T, the distance $l_1$ between the shoulder edge J of the substructure B and the ordinary jack I is made smaller than the distance $l_2$ between the shoulder edge J of the substructure B and the wedge-type jack apparatus 4, i.e., $l_1 < l_2$. This contributes to prevent breakdown of the substructure B in the region near the shoulder edge J.

I claim:

1. A wedge-type jack apparatus comprising:
   a wedge-like drive member restricted in movement in a widthwise direction and having inclined surface on both upper and lower sides,
   a lower member having on the upper side an inclined surface substantially commensurate with the inclined surface on the lower side of said wedge-like drive member and restricted in movement in both widthwise and lengthwise directions,
   an upper member having on the lower side an inclined surface substantially commensurate with the inclined surface on the upper side of said wedge-like drive member and restricted in both widthwise and lengthwise directions,
   push means for applying a lontitudinal pushing force to said wedge-like drive member to move said drive member longitudinally between said inclined surfaces of said lower and upper members, and
   stopper means independent of said push means for preventing movement of said wedge-like drive member out of a state between said lower and upper members to which pushed by said push means.

2. A wedge-type jack apparatus according to claim 1, wherein a slide plate movable responsive to movement occurred in said structure is disposed between said upper member and said structure.

3. A wedge-type jack apparatus according to claim 1, wherein a slide plate movable responsive to movement occurred in said structure is disposed between said upper member and said structure, and a buffer plate having a shape substantially commensurate with said slide plate is placed on said slide plate.

4. A wedge-type jack apparatus according to claim 1, wherein said wedge-like drive member is set to have an inclined angle in a range of 2.3°–33°.

5. A wedge-type jack apparatus according to claim 1, wherein low-friction plates are interposed at contact portions between said wedge-like drive member and the upper and lower members and/or at contact portions between said upper member and said slide plate disposed on said upper member.

6. A wedge-type jack apparatus according to claim 1, wherein at least one plate is interposed, as stopper means, between said push means and said wedge-like drive means for thereby restricting movement of said wedge-like drive member in a lengthwise direction.

7. A wedge-type jack apparatus according to claim 6 in which said at least one plate is metal.

8. A wedge-type jack apparatus according to claim 6 in which said at least one plate is resin.

* * * * *